(12) United States Patent
Dorney

(10) Patent No.: US 8,130,083 B2
(45) Date of Patent: Mar. 6, 2012

(54) SYSTEM AND METHOD FOR DISPLAYING PRESENTATIONS BASED ON CODES WRITTEN TO AND READ FROM RFID TAGS

(75) Inventor: Peter Dorney, Winter Springs, FL (US)

(73) Assignee: ValidFill LLC, Sarasota, FL (US)

(*) Notice: Subject to any disclaimer, the term of this patent is extended or adjusted under 35 U.S.C. 154(b) by 528 days.

(21) Appl. No.: 11/981,438

(22) Filed: Oct. 31, 2007

(65) Prior Publication Data

US 2009/0113513 A1    Apr. 30, 2009

(51) Int. Cl.
*H04Q 5/22* (2006.01)
*G06Q 30/00* (2006.01)
*H04H 9/00* (2006.01)

(52) U.S. Cl. ............... 340/10.52; 340/10.51; 705/14.53; 705/14.64; 705/14.65; 705/14.66; 725/11

(58) Field of Classification Search ............... 340/10.52, 340/10.51; 705/14.53, 14.64, 14.65, 14.66; 725/11
See application file for complete search history.

(56) References Cited

U.S. PATENT DOCUMENTS 6,317,718 B1 *  11/2001  Fano .............................. 705/1.1
(Continued)

OTHER PUBLICATIONS

Louis E. Frenzel, UHF RFID Chip Extends Reading Range to 10 Meters, Nov. 15, 2004, Ironwood Electronics (www.ironwoodelectronics.com).*

*Primary Examiner* — Hoang-Vu A Nguyen-Ba
(74) *Attorney, Agent, or Firm* — Buchanan Ingersoll & Rooney PC

(57) ABSTRACT

A system for displaying audio visual presentations based on customer preferences includes a radio frequency identification ("RFID writer") a reader, a display screen and a control system. The RFID writer writes a descriptive code onto an RFID tag, wherein the descriptive code containing customer specific information based on a consumer's purchase. The reader reads the descriptive code from an RFID tag when the tag enters a predetermined proximity of the reader. The control system is operatively coupled to the display screen and the reader and stores a plurality of audio-visual presentations. The control system initiates the display of an audio-visual presentation on the display screen based on the descriptive code, wherein the control system is adapted to play the audio-visual presentation in the order in which the RFID tag is read by the antenna.

15 Claims, 3 Drawing Sheets

U.S. PATENT DOCUMENTS

| | | |
|---|---|---|
| 6,356,905 B1 * | 3/2002 | Gershman et al. ............... 1/1 |
| 6,507,279 B2 | 1/2003 | Loof |
| 7,925,549 B2 * | 4/2011 | Looney et al. ............ 705/27.1 |
| 2003/0122857 A1 | 7/2003 | Marion |
| 2004/0103028 A1 | 5/2004 | Littman et al. |
| 2005/0114222 A1 * | 5/2005 | Mundy ..................... 705/26 |
| 2005/0154644 A1 | 7/2005 | Deakin et al. |
| 2006/0036485 A1 * | 2/2006 | Duri et al. .................. 705/14 |
| 2006/0074769 A1 * | 4/2006 | Looney et al. ................. 705/26 |
| 2006/0180647 A1 | 8/2006 | Hansen |
| 2008/0004950 A1 * | 1/2008 | Huang et al. .................. 705/14 |
| 2008/0004951 A1 * | 1/2008 | Huang et al. .................. 705/14 |
| 2008/0059297 A1 * | 3/2008 | Vallier et al. ................. 705/14 |
| 2008/0109320 A1 * | 5/2008 | Kleinhans .................... 705/26 |
| 2009/0002132 A1 * | 1/2009 | Diorio et al. .............. 340/10.42 |

\* cited by examiner

SYSTEM AND METHOD FOR DISPLAYING PRESENTATIONS BASED ON CODES WRITTEN TO AND READ FROM RFID TAGS

BACKGROUND OF THE INVENTION

Field of the Invention

Embodiments of the invention are in the field of customer-specific advertising

BRIEF SUMMARY OF THE INVENTION

Embodiments of the invention may provide a system for displaying audio visual presentations based on customer preferences. The system may include a radio frequency identification ("RFID") writer for writing a descriptive code onto an RFID tag. The descriptive code may contain customer specific information based on a consumer's purchase. The system may further include a reader for reading a descriptive code from an RFID tag when the tag enters a predetermined proximity of said reader, a display screen for displaying an audio-visual presentation, and a control system operatively coupled to the display screen and the reader. The control system stores a plurality of audio-visual presentations and initiates the display of an audio-visual presentation on a display screen based on the descriptive code, and the control system plays the audio-visual presentation in the order in which the RFID tag is read reader relative to any other RFID tags present.

DETAILED DESCRIPTION OF EMBODIMENTS OF THE INVENTION

Figure 1:
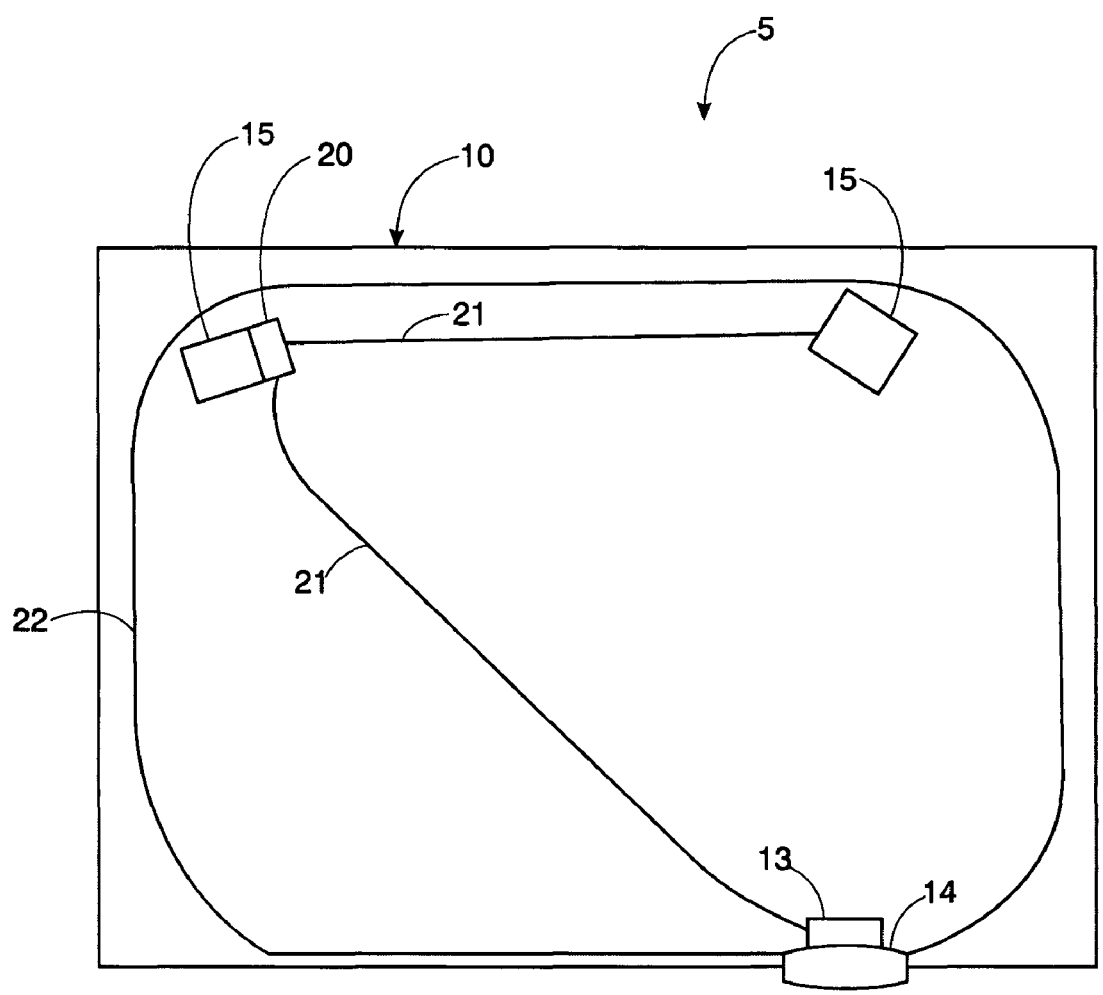
FIG. 1 is a system for selectively displaying customer specific audio visual displays on a monitor.

FIG. 1 illustrates a system 5 for selectively displaying customer-specific presentations within an area 10, such as a retail store or park. System 5 includes an RFID reader/antenna 13, which is shown positioned over a doorway 14 in FIG. 1. Reader/antenna 13 may be positioned in any location that a customer is likely to pass upon entering area 10. System 5 also includes at least one monitor 15. In the embodiment shown in FIG. 1, two monitors 15 are positioned at spaced-apart locations within area 10. For example, each monitor 15 may be positioned within a specific department, such as a sports department, clothing department or pharmacy. In addition, system 5 includes a control system 20, such as a CPU. Reader/antenna 13, which includes a reader portion and an antenna portion, and monitors 15 are operatively connected to control system 20. In one embodiment, reader/antenna 13, monitors 15 and control system 20 are connected via wires 21. Control system 20 may be integrally connected to monitor 15, as shown in FIG. 1.

The antenna portion of antenna/reader 13 may be a large field ultra-high-frequency (UHF) antenna having a read field 22 of between approximately 1 and 40 feet. The read field may be affected by metal objects within the field, such as metal shelves or stainless steel doors or fixtures. In an alternative embodiment, a high-frequency antenna may be used for reading passive or active RFID tags 25. Antenna/reader 13 may be positioned in any location where a desirable read field is achieved, such as in a ceiling tile or over an entrance to area 10. Area 10 may be a convenience store, theme park, retail outlet, airport, shopping mall, or anywhere marketing companies wish to sell add space. Antenna/reader 13 is constantly searching (i.e. approximately every 2 milliseconds) for RFID tag 25 within the read field. When a tag is located by the antenna portion of antenna/reader 13, the reader portion reads information from RFID tag 25. In an alternate embodiment, one or more proximity sensors (not shown) may be used to activate antenna/reader 13 when a person or object is detected. Antenna/reader 13 will then search for an RFID tag 25 in the read field.

Each RFID tag 25 may be a passive or active tag. Active or passive ultra-high-frequency (UHF) or high-frequency (HF) RFID tags may be used. Passive UHF tags are inexpensive and have a large read field, therefore they are a cost efficient choice. Active tags may be used to achieve a larger read field. All tags are read when they enter the read field.

Each RFID tag 25 is written with a tag ID number and a promotional or descriptive code. The tag ID number is a code used to identify a specific tag. The descriptive code may contain information regarding a customer's last purchase, location where the tag was purchased, or promotion that drove the purchase of the tag/item. The code may be selected by the owner or manager of the venue or area 10. For example, the descriptive code may be based on whether the last purchase included a sale item or may be based on the most expensive item purchased in order to promote resale of a higher margin item. The descriptive code may also include information regarding a hotel or resort where the customer is staying in order to create customer specific audio/visual displays. The descriptive code is written onto tag 25 by an RFID writer when an item is purchased. The item may be an RFID tagged cup, a UHF credit card, a loyalty card, etc. The descriptive codes may be broad or narrow. In an example of a broad code, the code may be generally "automotive" if a customer's last purchase was motor oil. This will cause an automotive-related audio/visual presentation to be shown. RFID tags 25 are capable of holding 128 bits; therefore, multiple descriptive codes may be stored on each tag 25. Tag 25 may contain a code for a customer's last purchase for each store department.

The descriptive codes are used to select customer specific audio/visual presentations to be displayed on monitors 15. One or more descriptive codes may be stored on RFID tag 25 at any given time. When RFID tag 25 is read by reader 13, the code is sent to control system 20. If different promotional codes are stored on the same RFID tag, control system 20 will select the code corresponding to the latest purchase at the current area 10. If a customer purchases product A at store A and later purchases a product B at store B, control system 20 will select the code corresponding to the product B when the customer next enters store B, even though both codes are stored on tag 25. If the descriptive code read from tag 25 is not recognized by control system 20 to play a designated presentation, control system 20 will read additional descriptive codes stored on tag 25 to see if a presentation can be selected. If no descriptive code is recognized, a default commercial will play. Each tag 25 may also include a security bit; therefore, if the bit does not match or is not recognized by antenna/reader 13 for area 10, tag 25 will not be read.

Each area 10, such as a retail store, is set up with RF Antenna/reader 13, control system 20 and monitors 15. The location of antenna/reader 13 in relation to each individual monitor 15 is determined and set up using range and bearing software. Control system 20 stores information regarding the location of each monitor 15 within area 10. When tag 25 enters the RF field the descriptive code and the Tag ID number are detected and read by reader/antenna 13 from each RFID tag 25. In one embodiment, range and bearing software determines the position of RFID tag 25 within approximately 1 foot throughout area 10. Multiple tags 25 can be located and tracked based on ID number using one or more antenna/readers 13. The Tag ID number and descriptive code are processed and stored by control system 20 in a "first in first out" play format, which is determined by the time tag 25 is read. Antenna/reader 13 is constantly reading the RF field; therefore, control system 20 is aware of the location of each tag 25 based on the tag ID number. If tag 25 with a particular ID number is 10-12 feet from a stationary monitor location, control system 20 will select and initiate the playback of a particular audio/visual presentation, such as a commercial or advertisement, on that monitor. When tag 25 leaves area 10 and the read field, the corresponding code and ID number are removed from the "first in first out" queue. The code and ID number may also be removed from the queue if a maximum time limit is exceeded.

Monitor 15 may receive the audio/visual presentation from control system 20 either thru a "first in first out" looping format, or based on the location of a particular tag (by ID number) determined by the range and bearing software. Each monitor 15 is hard-wired or connected to control system 20 using wireless communication. Control system 20 may receive audio/visual presentations and predetermined descriptive codes attached to those presentations through the use of the internet.

Figure 2:
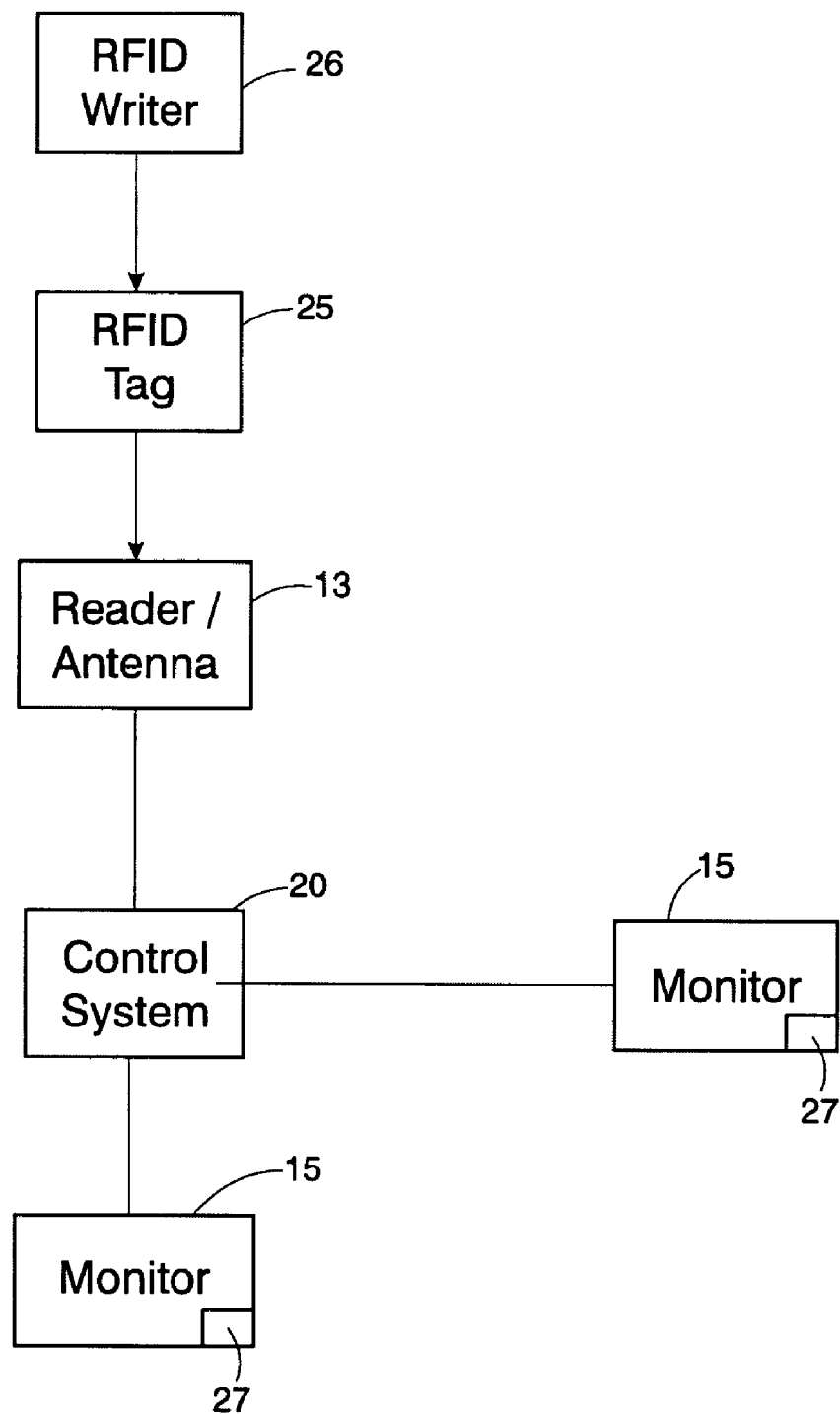
FIG. 2 is a system for selectively displaying multiple customer specific audio visual displays on a plurality of monitors.

In one embodiment, a customer is given an RFID card when the customer signs up for a loyalty program. Referring to FIG. 2, when an item is purchased, an RFID writer 26 writes a descriptive code onto RFID tag 25, which has a prewritten ID number. The descriptive code contains information on an item the store wants to advertise to the customer. The designated codes can be changed at any time according to the store's requirements. When the customer returns to the store, RFID tag 25 will be detected and read by antenna/reader 13. The tag ID number and descriptive code are time stamped when the customers enters area 10. The descriptive code that is read from tag 25 is placed into 2 locations: (1) a main controller storage area for playing designated audio visual presentations at designated monitors through out the store and (2) a secondary storage area where the codes are sorted by categories, such as by store department, so that the codes generate audio/visual presentations in designated departments in a continuous "first in first out" loop. Each department will have continuously looping presentations selected based on the codes read from tags 25 within area 10, regardless of the location of tags 25. For example, if a customer's RFID tag 25 included a code for oil because the customer previously purchased oil, an audio/visual presentation relating to oil will be added to the queue in the automotive department, even if the customer is in another section of the store. In addition, the audio/visual presentation relating to oil will play on any monitor when the customer having the corresponding RFID tag 25 passes by. The presentation may display when a customer is between 1 and 40 feet from monitor 15. The optimal distance may be set according to the traffic flow at each monitor location.

Control system 20 will prevent the same presentation from playing for a period of time after it has already played. A designated number of presentations must play before one will replay. However, in one embodiment, a presentation may replay if a customer with a particular tag 25 comes within a designated distance of monitor. In conjunction with the range and bearing software, antenna/reader 13 is constantly reading the field for RFID tags 25 in relationship to monitors 15 (stationary points) using the control system storage. No matter where the customer with RFID tag 25 is located in area 10, control system 20 will send the designated audio/visual presentation to a particular monitor 15 that the customer is walking past within a predetermined distance. Following the presentation on monitor 15, the ID number and promotional code will be sent back into the main storage queue of control system 20 to be played later if the customer walks past the same or a different monitor 15.

Each time a customer makes a purchase at a cash register equipped with an RFID writer within area 10, RFID tag 25 is written with information regarding the purchase. Therefore, each transaction typically results in a different code being written onto tag 25. However, the code may be the same if a customer's purchase is the same as a previous purchase. RFID tag 25 may be written with customer-specific information at the cash register. Specific information may include date of purchase, time of purchase and an identification of what was purchased. The information may then be used to play targeted audio-visual presentations the next time the customer visits the store.

If more than one RFID tag enters the proximity of monitor 15, the tag 25 that entered the read field 22 first (i.e. earlier time stamp) will be given priority. Each audio visual presentation may be any desired length. In one embodiment, presentations are commercials that display for 10-45 seconds. The presentation will not discontinue if a customer leaves the area. Rather, the presentation will run to completion.

Figure 3:
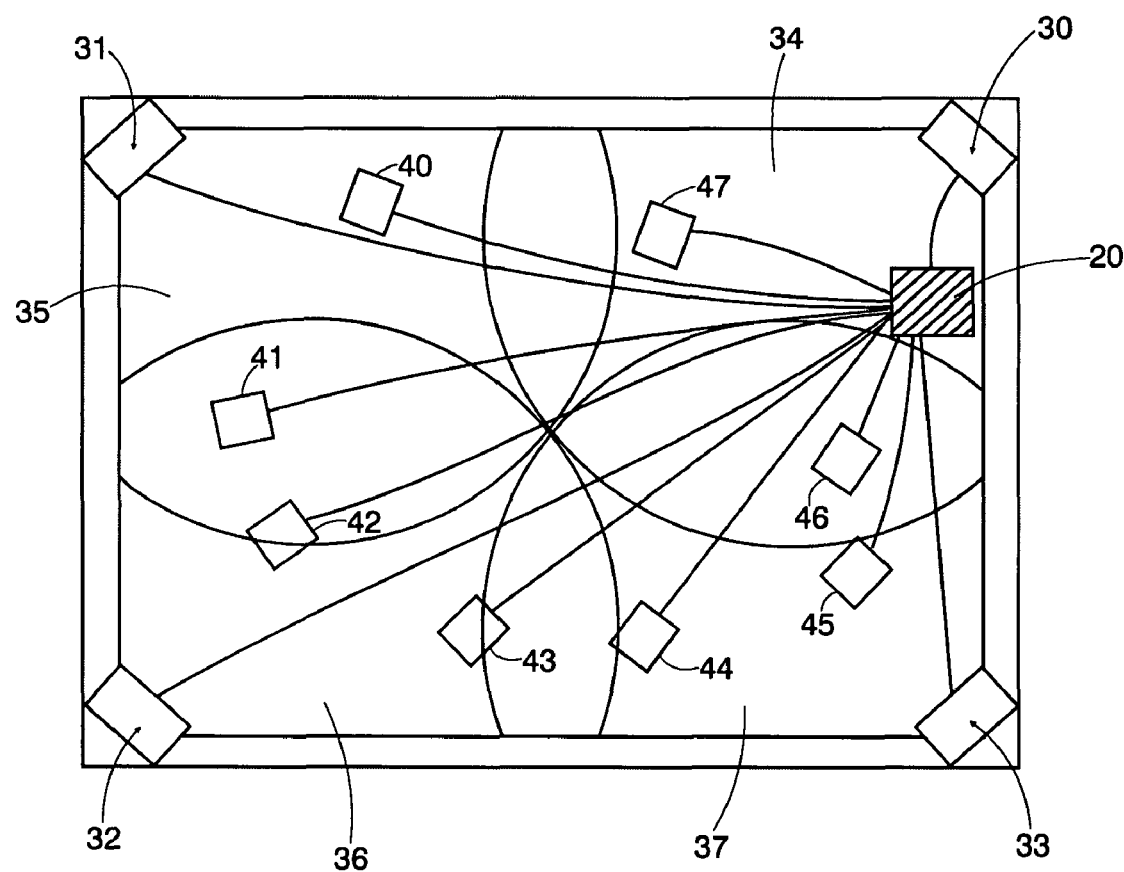
FIG. 3 is a system for selectively displaying multiple customer specific audio visual displays having multiple readers and antennas.

As discussed above, antenna/ reader 13 is placed in a location where it will obtain the best read field, such as over an entryway. As shown in FIG. 3, multiple reader/antennas 30-33 may be used if area 10 (such as a store) is very large. If multiple reader/antennas 30-33 are used, each reader/antenna is designated to a specific monitor or group of monitors 40-47. Each reader/antenna 30-33 generates a read field 34-37. As depicted in FIG. 3, reader/antenna 30 generates read field 34, which is designated to monitors 46 and 47. All of the reader/antennas are operatively linked back to control system 20 where the main storage and the descriptive codes are located. This will allow the main CPU/RFID descriptive code storage to be played at any monitor in any location in the store. When monitors 15 are initially set up for an area 10, control system 20 locates RFID tags 27 that are positioned on monitors 15. Monitor RFID tags 27 include an ID code that allows control system 20 to recognize that tag 27 is associated with monitor 15. Reader/antenna 13 reads the monitor's ID code after it determines it is a monitor. The ID code numbers are individual ID numbers given to each monitor. The numbers may also be printed on the tags so the person setting up the network will know which ID number corresponds to each monitor. The person setting up the system enters the monitor ID numbers into control system 20 by specific store departments. After this initial setup, control system 20 "knows" which monitor ID numbers are in each store department. Therefore, descriptive codes from RFID tags 25 may be sorted into queues by store department, as explained above.

Reader/antenna 13 reads area 10 for customer RFID tags 25 every 2 milliseconds and determines where that tag 25 is located in reference to each stationary monitor RFID tag 27. When Customers RFID tags 25 are within a predetermined distance from stationary monitor tags 27 the audio/visual presentation from the store department queue will gain priority and move to the front of the queue line and play. The predetermined distances may be changed at a set up screen according to area's 10 traffic flow requirements.

In another embodiment, products within area 10 have RFID tags attached thereto for inventory or other purposes. If a customer with RFID tag 25 is detected in the proximity of a shelf with an RFID tagged item for a designated period of time, control system 20 will cause reader/antenna 13 to read the tags coupled to the items in the proximity of the customer. An audio-visual presentation will then be played back on a nearby monitor 15. The audio-visual presentation may be a commercial for a product brand that has purchased advertising space in a particular area of a store.

System 15 may be configured such that if a customer places an RFID tagged item in a cart, reader/antenna 13 will detect that the tagged item is moving with the customers RFID tag 25 using range and barring software. Once a tagged item is placed within the cart and detected as moving with a customer's tag 25, control system 20 will prevent the playback of an audio-visual presentation corresponding to the tagged item. However, if the tagged item in the cart is a complementary product to a potential future purchase, such as bread being a complimentary product to deli meat, control system 20 may place an audio-visual presentation corresponding to the complementary product ahead of audio-visual presentation based on the customer's promotional code if the customer is in the proximity of the complementary product.

Many features and advantages of the present invention are apparent from the detailed specification, and thus, it is intended by the appended claims to cover all such features and advantages of the invention which fall within the true spirit and scope of the invention.

However, numerous modifications and variations may readily occur to those skilled in the art, and it is not desired that the present invention be limited to the exact construction and operation illustrated and described herein, and accordingly, all suitable modifications and equivalents which may be resorted to are intended to fall within the scope of the claims.

I claim:

1. A system for displaying audio visual presentations based on customer preferences comprising:
   an RFID writer for writing a descriptive code onto a customer's RFID tag, said descriptive code containing customer specific information based on a customer's purchase;
   a reader for reading said descriptive code from the customer's RFID tag when the tag enters a predetermined proximity of said reader;
   a plurality of display screens for displaying an audio-visual presentation showing a product, wherein each display screen contains a display RFID tag identifying the location of that display;
   a product RFID tag affixed to the product;
   a movement sensor which scans for movement of said customer's RFID tag and said product RFID tag; and
   a control system operatively coupled to said plurality of display screens, said reader, and said movement sensor, said control system being adapted to store a plurality of audio-visual presentations, capable of initiating display of an audio-visual presentation on one of said plurality of display screens based on said descriptive code, wherein said control system is adapted to play the audio-visual presentation on the display screen in nearest proximity to the customer's RFID tag as determined by the location of the customer's RFID tag and the display RFID tag, and capable of ceasing display of the audio-visual presentation when said customer's RFID tag and said product RFID tag are moving in tandem.

2. The system according to claim 1 wherein said reader is constantly reading an area for a customer's RFID tag.

3. The system according to claim 1 further comprising a proximity sensor coupled to said reader, said proximity sensor adapted to detect the presence of a person near said proximity sensor and to activate said reader to scan a read field for a customer's RFID tag.

4. The system according to claim 1 wherein said reader is adapted to read a passive ultra high-frequency (UHF) RFID tag.

5. The system according to claim 1 wherein said reader is adapted to read an ID number from said customer's RFID tag, said ID number being used to track the position of the customer's RFID tag within a predetermined area.

6. The system according to claim 5 wherein said control system is adapted to play an audio-visual presentation based on a descriptive code when a corresponding customer's RFID tag is within a predetermined distance to said display screen.

7. The system according to claim 1 wherein said control system is adapted to assign each descriptive code to a category corresponding to a specific location, each specific location having a separate ranking list.

8. The system according to claim 1 wherein said reader is positioned remotely from said display screen.

9. A method for displaying and ceasing display of audio visual presentations based on customer preferences and selections comprising:
   reading a first descriptive code from a first RFID tag when the tag enters a predetermined proximity of an RFID reader, said first descriptive code containing customer information based on a customer's purchase;
   selecting a first audio-visual presentation based on said first descriptive code, said first audio-visual presentation promoting a product, said product bearing a second RFID tag and said second RFID tag bearing a second descriptive code; and
   displaying said first audio-visual presentation on a display screen in proximity of a customer;
   scanning for movement of said first RFID tag and said second RFID tag; and
   ceasing display of said first audio-visual presentation when said first RFID tag and said second RFID tag are moving in tandem.

10. The method according to claim 9 further comprising selecting and displaying a second audio-visual presentation based on said second descriptive code corresponding to the second RFID tag within the proximity of the display screen after ceasing display of the first audio-visual presentation.

11. The method according to claim 9 wherein said reader is constantly reading an area for a customer's RFID tag.

12. The method according to claim 9 further comprising detecting the presence of a person near a proximity sensor and activating said reader to scan a read field for said first RFID tag.

13. The method according to claim 9 wherein said reader is adapted to read a passive ultra high-frequency (UHF) RFID tag.

14. The method according to claim 9 wherein said reader is adapted to read an ID number from said first RFID tag, said ID number being used to track the position of the first RFID tag within a predetermined area.

15. The method according to claim 9 wherein said reader is positioned remotely from said display screen.

* * * * *